Sept. 18, 1962 W. RODGERS 3,054,603
CARBURETTORS
Filed Aug. 5, 1960 2 Sheets-Sheet 1

INVENTOR
WILLIAM RODGERS
BY Irwin S. Thompson
ATTORNEY

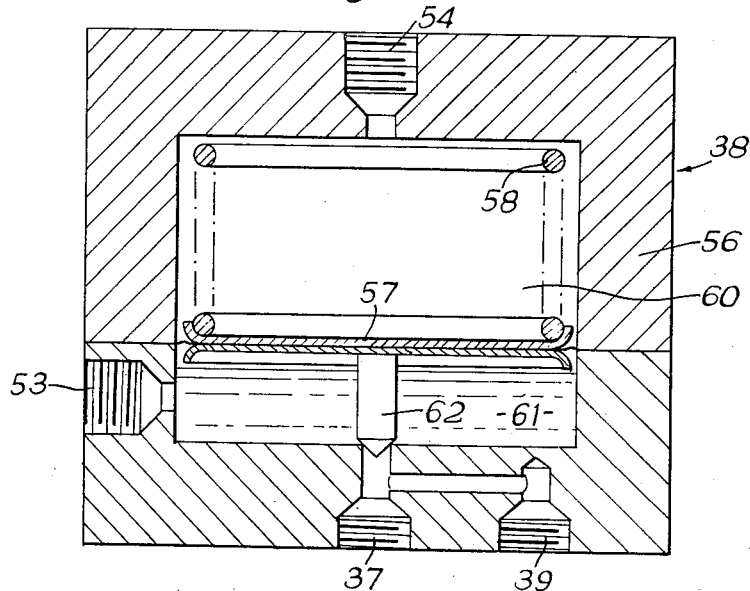
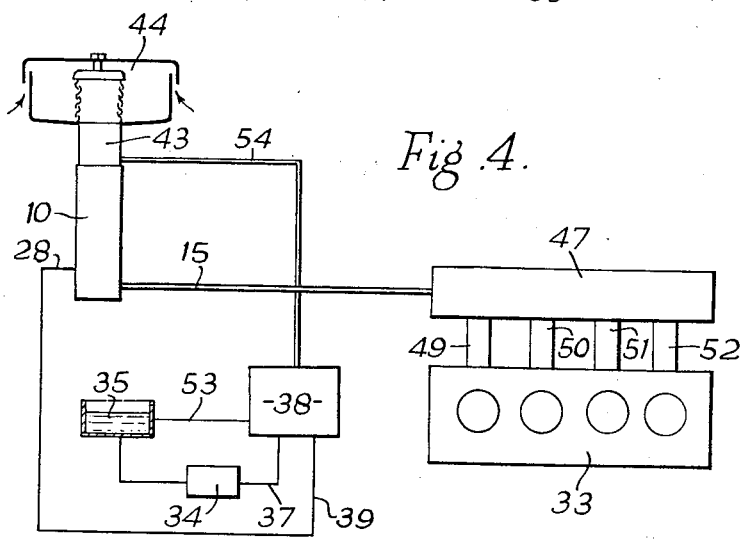

United States Patent Office 3,054,603
Patented Sept. 18, 1962

3,054,603
CARBURETTORS
William Rodgers, Brisbane, Australia, assignor to Engineering Research and Application Limited, Dunstable, England
Filed Aug. 5, 1960, Ser. No. 47,721
Claims priority, application Great Britain May 27, 1960
9 Claims. (Cl. 261—50)

This invention relates to carburettors and its main object is to provide a simplified and durable construction.

According to the invention the supply of fuel and air is controlled by a movable valve device which meters fuel and air at a varying rate with varying displacement of position, and the valve device is urged in the one direction by the pressure of incoming air and in the opposite direction by the fuel. With increasing air intake the valve device is moved to increase the air inlet opening and this automatically causes the valve device to admit an increased quantity of fuel. The fuel/air ratio may be maintained constant over all the engine speed range or a richer mixture may be provided at desired parts of the range. The fuel may be supplied to the valve at constant pressure or the fuel pressure may be varied, e.g. according to manifold pressure when using a fuel distributor to supply engine ports separately.

Constructional forms of the invention will now be described by way of example with reference to the accompanying diagrammatic drawings wherein:

FIGURE 4 is a schematic view showing the connections of the carburettor of FIGURE 3 to an engine; and FIGURE 5 is a sectional view of a device for controlling the pressure of fuel fed to the carburettor.

Figure 1:
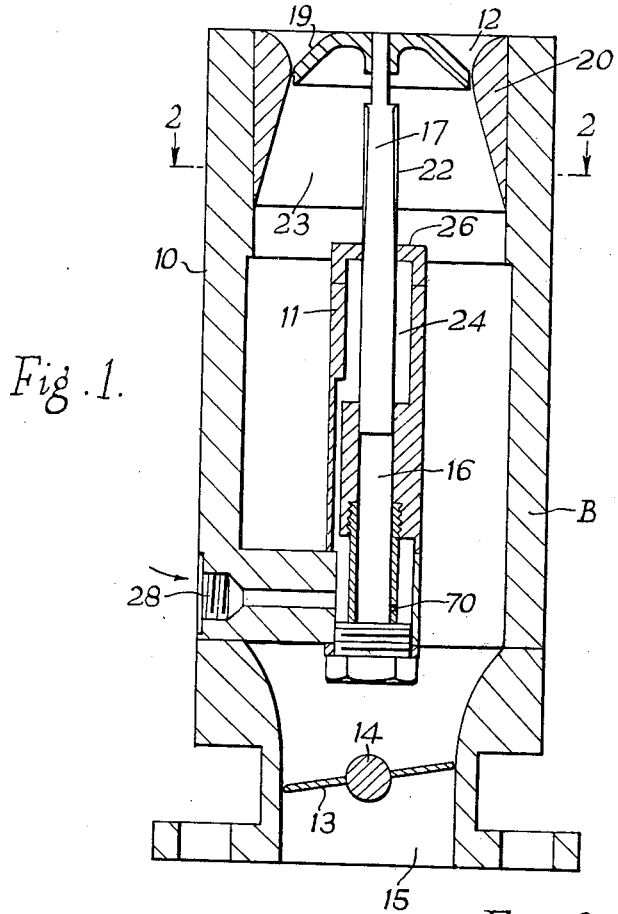
FIGURE 1 is a section view of a carburettor made in accordance with the invention.
Figure 2:
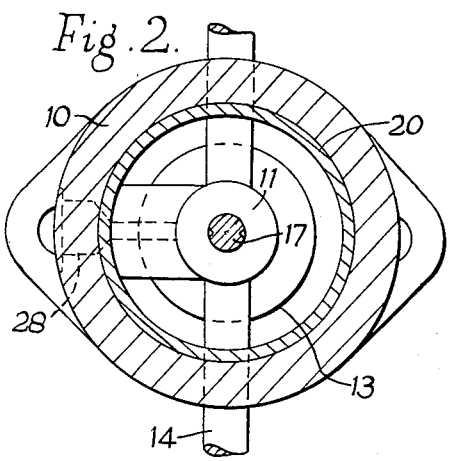
FIGURE 2 is a sectional view of the line 2—2 on FIGURE 1.

In the constructional form of the invention a cylindrical housing 10 has a valve body 11 mounted coaxially within it. One end of the housing has an air flow inlet 12 and the other end of the housing has an outlet 15 to the engine manifold controlled by a throttle butterfly valve 13 and spindle 14. The body has a bore 16 in which a valve stem 17 forming part of a valve member in slidably mounted coaxially with the housing. This stem constitutes a fuel flow control member and carries a valve head or airflow control member 19 which cooperates with the air inlet opening 12. The latter contains a cylindrical member 20 the inner surface of which is shaped with an increasing diameter inwardly of the housing so as to increase the admission area as the valve head 19 moves inwardly. The valve stem has two tapered ports in the form of grooves 21, 22 in its exterior surface which form a fuel control communication between a fuel/air mixing chamber 23 in the housing and a fuel chamber 24 in the valve body. The stem slides in an annular guide 26 which surrounds the stem about the groove so that movement of the valve device (i.e. stem, head and fuel valve member) in one direction opens the air opening and fuel opening. The action of the valve stem in cooperation with the annular guide provides a damping action which resists rapid movement of the valve by displacement of fuel from the bore 16 through the damping orifice 70 located between the fuel inlet space 24 and the valve bore 16.

The fuel is supplied through a port 28 in the housing to the valve body into the hollow valve member.

Increase of air intake by the engine acts on the valve head to open the air inlet area and this automatically opens the fuel valve. The product of the air head loss across the valve head and the air valve area is equal to the fuel head loss across the fuel valve member and the area of the tapered valve member.

Figure 3:
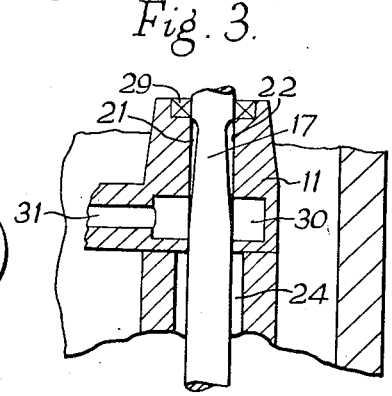
FIGURE 3 is a view of part of FIGURE 1 but showing a modified construction.

The carburettor may be modified to suit port injection systems. Thus as shown in FIGURE 3 the valve body is sealed off from the mixing chamber 23 by a seal 29 and a separate fuel outlet chamber 30 surrounds the stem and has a fuel outlet 31. The tapered ports 21, 22 control flow of fuel from the fuel valve chamber 24 to the fuel outlet chamber 30.

The carburettor of FIGURE 1 may be connected with an engine as indicated in FIGURE 4 wherein the engine is shown at 33. A fuel pump 34 supplies fuel from a tank 35 to the inlet 37 of a pressure control device 38 later described with reference to FIGURE 5. From the device 38 fuel is fed from an outlet 39 to the fuel inlet 28 of the housing 10. The air and fuel from the outlet 15 of the housing 10 flows to a manifold 47 whence it is supplied to the engine ports by pipes 49, 50, 51, 52. A pipe 53 conveys overflow fuel from the device 38 back to the tank 35. The device 38 has an air space connected by pipe 54 to an air intake pipe 43 which is provided with a filter 44.

As shown in FIGURE 5 the device 38 comprises a cylinder 56 having a movable wall or diaphragm 57 therein urged in one direction by a spring 58 acting on one side of the diaphragm. The diaphragm divides the cylinder space into an air space 60 and a fuel space 61. The diaphragm carries a needle valve member 62 controlling inlet of fuel at 37 from the pump 34. The air space has the outlet 54 connected to the air intake 43.

I claim:

1. A carburettor comprising a housing having an air flow opening and containing a fuel flow valve body having a fuel inlet and a fuel outlet; a movable valve member having a fuel flow control member slidably mounted in a bore in the valve body and having an air flow control member movable in said air flow opening, movement of the valve member under increasing air pressure increasing fuel flow from the valve body and increasing the air flow opening, and means disposed in said bore and communicating with said fuel inlet to provide a body of fuel to dampen the movements of said movable valve member.

2. A carburettor as claimed in claim 1 wherein the air flow opening has a frustoconical shape.

3. A carburettor as claimed in claim 1 wherein the fuel flow control member is a stem moving axially through an opening in the valve body and provided with at least one axially extending groove of increasing cross-sectional size along its length through which fuel passes from the valve body to a fuel outlet.

4. A carburettor as claimed in claim 3 wherein fuel is supplied from a pump through a device for controlling the pressure of fuel to keep it constant.

5. A carburettor as claimed in claim 1 wherein the housing has a mixing chamber into which the air and fuel from the valve body enters.

6. A carburettor as claimed in claim 3 having a fuel collecting member for conducting the metered fuel to a fuel distributor for port injection.

7. A carburettor as claimed in claim 4 wherein the air is supplied from the housing to a manifold and the manifold suction is applied to the constant pressure device in the direction to offset the air suction on the metered fuel flow.

8. A carburettor as claimed in claim 4 wherein the constant pressure device is a chamber containing a movable diaphragm acted on by a spring and having fuel inlet and outlet openings.

9. A carburettor as claimed in claim 1 wherein said means for providing a body of fuel to said bore for damping said movable valve member consists of an orifice disposed in said bore adjacent said fuel inlet.

References Cited in the file of this patent
UNITED STATES PATENTS

| | | |
|---|---|---|
| 1,972,374 | Brannigan | Sept. 4, 1934 |
| 2,574,670 | Sweeney | Nov. 13, 1951 |
| 2,591,356 | Howe | Apr. 1, 1952 |
| 2,868,522 | O'Neil | Jan. 13, 1959 |